United States Patent
Freeman et al.

(10) Patent No.: US 9,406,078 B2
(45) Date of Patent: Aug. 2, 2016

(54) SYSTEM AND METHOD FOR DELIVERING TARGETED ADVERTISEMENTS AND/OR PROVIDING NATURAL LANGUAGE PROCESSING BASED ON ADVERTISEMENTS

(71) Applicant: VOICEBOX TECHNOLOGIES CORPORATION, Bellevue, WA (US)

(72) Inventors: Tom Freeman, Mercer Island, WA (US); Mike Kennewick, Bellevue, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/836,606

(22) Filed: Aug. 26, 2015

(65) Prior Publication Data

US 2015/0364133 A1 Dec. 17, 2015

Related U.S. Application Data

(63) Continuation of application No. 14/537,598, filed on Nov. 10, 2014, which is a continuation of application No. 14/016,757, filed on Sep. 3, 2013, now Pat. No. 8,886,536, which is a continuation of application No.

(Continued)

(51) Int. Cl.
 *G10L 15/26* (2006.01)
 *G06Q 30/02* (2012.01)
 (Continued)

(52) U.S. Cl.
 CPC .......... *G06Q 30/0251* (2013.01); *G06F 17/275* (2013.01); *G06Q 30/0241* (2013.01); *G06Q 30/0242* (2013.01); *G10L 15/18* (2013.01); *G10L 15/26* (2013.01); *G10L 15/265* (2013.01)

(58) Field of Classification Search
 CPC ............................. G10L 15/22; H04M 3/4878
 See application file for complete search history.

(56) References Cited

U.S. PATENT DOCUMENTS 4,430,669 A 2/1984 Cheung
4,821,027 A 4/1989 Mallory
(Continued)

FOREIGN PATENT DOCUMENTS

EP 1320043 A2 6/2003
EP 1646037 4/2006
(Continued)

OTHER PUBLICATIONS

Wu, Su-Lin, et al. "Integrating syllable boundary information into speech recognition." Acoustics, Speech, and Signal Processing, 1997. ICASSP-97., 1997 IEEE International Conference on. vol. 2. IEEE, 1997.*

(Continued)

*Primary Examiner* — Brian Albertalli
(74) *Attorney, Agent, or Firm* — Sheppard Mullin Richter & Hampton LLP

(57) ABSTRACT

The system and method described herein may use various natural language models to deliver targeted advertisements and/or provide natural language processing based on advertisements. In one implementation, an advertisement associated with a product or service may be provided for presentation to a user. A natural language utterance of the user may be received. The natural language utterance may be interpreted based on the advertisement and, responsive to the existence of a pronoun in the natural language utterance, a determination of whether the pronoun refers to one or more of the product or service or a provider of the product or service may be effectuated.

30 Claims, 3 Drawing Sheets

Related U.S. Application Data

13/371,870, filed on Feb. 13, 2012, now Pat. No. 8,527,274, which is a continuation of application No. 12/847,564, filed on Jul. 30, 2010, now Pat. No. 8,145,489, which is a continuation of application No. 11/671,526, filed on Feb. 6, 2007, now Pat. No. 7,818,176.

(51) Int. Cl.
  *G10L 15/18* (2013.01)
  *G06F 17/27* (2006.01)

(56) References Cited

U.S. PATENT DOCUMENTS

| | | | |
|---|---|---|---|
| 4,829,423 A | 5/1989 | Tennant | |
| 4,887,212 A | 12/1989 | Zamora | |
| 4,910,784 A | 3/1990 | Doddington | |
| 5,027,406 A | 6/1991 | Roberts | |
| 5,155,743 A | 10/1992 | Jacobs | |
| 5,164,904 A | 11/1992 | Sumner | |
| 5,208,748 A | 5/1993 | Flores | |
| 5,265,065 A | 11/1993 | Turtle | |
| 5,274,560 A | 12/1993 | LaRue | |
| 5,357,596 A | 10/1994 | Takebayashi | |
| 5,369,575 A | 11/1994 | Lamberti | |
| 5,377,350 A | 12/1994 | Skinner | |
| 5,386,556 A | 1/1995 | Hedin | |
| 5,424,947 A | 6/1995 | Nagao | |
| 5,471,318 A | 11/1995 | Ahuja | |
| 5,475,733 A | 12/1995 | Eisdorfer | |
| 5,479,563 A | 12/1995 | Yamaguchi | |
| 5,488,652 A | 1/1996 | Bielby | |
| 5,499,289 A | 3/1996 | Bruno | |
| 5,500,920 A | 3/1996 | Kupiec | |
| 5,517,560 A | 5/1996 | Greenspan | |
| 5,533,108 A | 7/1996 | Harris | |
| 5,537,436 A | 7/1996 | Bottoms | |
| 5,539,744 A | 7/1996 | Chu | |
| 5,557,667 A | 9/1996 | Bruno | |
| 5,559,864 A | 9/1996 | Kennedy, Jr. | |
| 5,563,937 A | 10/1996 | Bruno | |
| 5,577,165 A | 11/1996 | Takebayashi | |
| 5,590,039 A | 12/1996 | Ikeda | |
| 5,608,635 A | 3/1997 | Tamai | |
| 5,617,407 A | 4/1997 | Bareis | |
| 5,633,922 A | 5/1997 | August | |
| 5,634,086 A | 5/1997 | Rtischev | |
| 5,652,570 A | 7/1997 | Lepkofker | |
| 5,675,629 A | 10/1997 | Raffel | |
| 5,696,965 A | 12/1997 | Dedrick | |
| 5,708,422 A | 1/1998 | Blonder | |
| 5,721,938 A | 2/1998 | Stuckey | |
| 5,722,084 A | 2/1998 | Chakrin | |
| 5,740,256 A | 4/1998 | CastelloDaCosta | |
| 5,742,763 A | 4/1998 | Jones | |
| 5,748,841 A | 5/1998 | Morin | |
| 5,748,974 A | 5/1998 | Johnson | |
| 5,752,052 A | 5/1998 | Richardson | |
| 5,754,784 A | 5/1998 | Garland | |
| 5,761,631 A | 6/1998 | Nasukawa | |
| 5,774,841 A | 6/1998 | Salazar | |
| 5,774,859 A | 6/1998 | Houser | |
| 5,794,050 A | 8/1998 | Dahlgren | |
| 5,794,196 A | 8/1998 | Yegnanarayanan | |
| 5,797,112 A | 8/1998 | Komatsu | |
| 5,799,276 A | 8/1998 | Komissarchik | |
| 5,802,510 A | 9/1998 | Jones | |
| 5,829,000 A | 10/1998 | Huang | |
| 5,832,221 A | 11/1998 | Jones | |
| 5,839,107 A | 11/1998 | Gupta | |
| 5,848,396 A | 12/1998 | Gerace | |
| 5,855,000 A | 12/1998 | Waibel | |
| 5,867,817 A | 2/1999 | Catallo | |
| 5,878,385 A | 3/1999 | Bralich | |
| 5,878,386 A | 3/1999 | Coughlin | |
| 5,892,813 A | 4/1999 | Morin | |
| 5,892,900 A | 4/1999 | Ginter | |
| 5,895,464 A | 4/1999 | Bhandari | |
| 5,895,466 A | 4/1999 | Goldberg | |
| 5,897,613 A | 4/1999 | Chan | |
| 5,902,347 A | 5/1999 | Backman | |
| 5,911,120 A | 6/1999 | Jarett | |
| 5,918,222 A | 6/1999 | Fukui | |
| 5,926,784 A | 7/1999 | Richardson | |
| 5,933,822 A | 8/1999 | Braden-Harder | |
| 5,950,167 A | 9/1999 | Yaker | |
| 5,953,393 A | 9/1999 | Culbreth | |
| 5,960,397 A | 9/1999 | Rahim | |
| 5,960,399 A | 9/1999 | Barclay | |
| 5,960,447 A | 9/1999 | Holt | |
| 5,963,894 A | 10/1999 | Richardson | |
| 5,963,940 A | 10/1999 | Liddy | |
| 5,983,190 A | 11/1999 | Trowerll | |
| 5,987,404 A | 11/1999 | Della Pietra | |
| 5,991,721 A | 11/1999 | Asano | |
| 5,995,119 A | 11/1999 | Cosatto | |
| 5,995,928 A | 11/1999 | Nguyen | |
| 5,995,943 A * | 11/1999 | Bull | G06F 17/30067 705/14.39 |
| 6,009,382 A | 12/1999 | Martino | |
| 6,014,559 A | 1/2000 | Amin | |
| 6,018,708 A | 1/2000 | Dahan | |
| 6,021,384 A | 2/2000 | Gorin | |
| 6,028,514 A | 2/2000 | Lemelson | |
| 6,035,267 A | 3/2000 | Watanabe | |
| 6,044,347 A | 3/2000 | Abella | |
| 6,049,602 A | 4/2000 | Foladare | |
| 6,049,607 A | 4/2000 | Marash | |
| 6,058,187 A | 5/2000 | Chen | |
| 6,067,513 A | 5/2000 | Ishimitsu | |
| 6,073,098 A | 6/2000 | Buchsbaum | |
| 6,076,059 A | 6/2000 | Glickman | |
| 6,078,886 A | 6/2000 | Dragosh | |
| 6,081,774 A | 6/2000 | deHita | |
| 6,085,186 A | 7/2000 | Christianson | |
| 6,101,241 A | 8/2000 | Boyce | |
| 6,108,631 A | 8/2000 | Ruhl | |
| 6,119,087 A | 9/2000 | Kuhn | |
| 6,119,101 A * | 9/2000 | Peckover | G06Q 30/02 705/14.17 |
| 6,122,613 A | 9/2000 | Baker | |
| 6,134,235 A | 10/2000 | Goldman | |
| 6,144,667 A | 11/2000 | Doshi | |
| 6,144,938 A | 11/2000 | Surace | |
| 6,154,526 A | 11/2000 | Dahlke | |
| 6,160,883 A | 12/2000 | Jackson | |
| 6,167,377 A | 12/2000 | Gillick | |
| 6,173,266 B1 | 1/2001 | Marx | |
| 6,173,279 B1 | 1/2001 | Levin | |
| 6,175,858 B1 | 1/2001 | Bulfer | |
| 6,185,535 B1 | 2/2001 | Hedin | |
| 6,188,982 B1 | 2/2001 | Chiang | |
| 6,192,110 B1 | 2/2001 | Abella | |
| 6,192,338 B1 | 2/2001 | Haszto | |
| 6,195,634 B1 | 2/2001 | Dudemaine | |
| 6,195,651 B1 | 2/2001 | Handel | |
| 6,199,043 B1 | 3/2001 | Happ | |
| 6,208,964 B1 | 3/2001 | Sabourin | |
| 6,208,972 B1 | 3/2001 | Grant | |
| 6,219,346 B1 | 4/2001 | Maxemchuk | |
| 6,219,643 B1 | 4/2001 | Cohen | |
| 6,226,612 B1 | 5/2001 | Srenger | |
| 6,233,556 B1 | 5/2001 | Teunen | |
| 6,233,559 B1 | 5/2001 | Balakrishnan | |
| 6,233,561 B1 | 5/2001 | Junqua | |
| 6,236,968 B1 | 5/2001 | Kanevsky | |
| 6,246,981 B1 | 6/2001 | Papineni | |
| 6,246,990 B1 | 6/2001 | Happ | |
| 6,266,636 B1 | 7/2001 | Kosaka | |
| 6,269,336 B1 | 7/2001 | Ladd | |
| 6,272,455 B1 | 8/2001 | Hoshen | |
| 6,275,231 B1 | 8/2001 | Obradovich | |
| 6,278,377 B1 | 8/2001 | DeLine | |
| 6,278,968 B1 | 8/2001 | Franz | |

(56) References Cited

U.S. PATENT DOCUMENTS

| | | | |
|---|---|---|---|
| 6,286,002 B1 * | 9/2001 | Axaopoulos | G06F 17/30864 705/26.8 |
| 6,288,319 B1 | 9/2001 | Catona | |
| 6,292,767 B1 | 9/2001 | Jackson | |
| 6,301,560 B1 | 10/2001 | Masters | |
| 6,308,151 B1 | 10/2001 | Smith | |
| 6,311,159 B1 | 10/2001 | VanTichelen | |
| 6,314,402 B1 | 11/2001 | Monaco | |
| 6,321,196 B1 | 11/2001 | Franceschi | |
| 6,356,869 B1 | 3/2002 | Chapados | |
| 6,362,748 B1 | 3/2002 | Huang | |
| 6,366,882 B1 | 4/2002 | Bijl | |
| 6,366,886 B1 | 4/2002 | Dragosh | |
| 6,374,214 B1 | 4/2002 | Friedland | |
| 6,377,913 B1 | 4/2002 | Coffman | |
| 6,381,535 B1 | 4/2002 | Durocher | |
| 6,385,596 B1 | 5/2002 | Wiser | |
| 6,385,646 B1 | 5/2002 | Brown | |
| 6,393,403 B1 | 5/2002 | Majaniemi | |
| 6,393,428 B1 | 5/2002 | Miller | |
| 6,397,181 B1 | 5/2002 | Li | |
| 6,404,878 B1 | 6/2002 | Jackson | |
| 6,405,170 B1 | 6/2002 | Phillips | |
| 6,408,272 B1 | 6/2002 | White | |
| 6,411,810 B1 | 6/2002 | Maxemchuk | |
| 6,411,893 B2 | 6/2002 | Ruhl | |
| 6,415,257 B1 | 7/2002 | Junqua | |
| 6,418,210 B1 | 7/2002 | Sayko | |
| 6,420,975 B1 | 7/2002 | DeLine | |
| 6,429,813 B2 | 8/2002 | Feigen | |
| 6,430,285 B1 | 8/2002 | Bauer | |
| 6,430,531 B1 | 8/2002 | Polish | |
| 6,434,523 B1 | 8/2002 | Monaco | |
| 6,434,524 B1 | 8/2002 | Weber | |
| 6,434,529 B1 | 8/2002 | Walker | |
| 6,442,522 B1 | 8/2002 | Carberry | |
| 6,446,114 B1 | 9/2002 | Bulfer | |
| 6,453,153 B1 | 9/2002 | Bowker | |
| 6,453,292 B2 | 9/2002 | Ramaswamy | |
| 6,456,711 B1 | 9/2002 | Cheung | |
| 6,456,974 B1 | 9/2002 | Baker | |
| 6,466,654 B1 | 10/2002 | Cooper | |
| 6,466,899 B1 | 10/2002 | Yano | |
| 6,470,315 B1 | 10/2002 | Netsch | |
| 6,487,494 B2 | 11/2002 | Odinak | |
| 6,487,495 B1 | 11/2002 | Gale | |
| 6,498,797 B1 | 12/2002 | Anerousis | |
| 6,499,013 B1 | 12/2002 | Weber | |
| 6,501,833 B2 | 12/2002 | Phillips | |
| 6,501,834 B1 | 12/2002 | Milewski | |
| 6,505,155 B1 | 1/2003 | Vanbuskirk | |
| 6,510,417 B1 | 1/2003 | Quilici | |
| 6,513,006 B2 | 1/2003 | Howard | |
| 6,522,746 B1 | 2/2003 | Marchok | |
| 6,523,061 B1 | 2/2003 | Halverson | |
| 6,532,444 B1 | 3/2003 | Weber | |
| 6,539,348 B1 | 3/2003 | Bond | |
| 6,549,629 B2 | 4/2003 | Finn | |
| 6,553,372 B1 | 4/2003 | Brassell | |
| 6,556,970 B1 | 4/2003 | Sasaki | |
| 6,556,973 B1 | 4/2003 | Lewin | |
| 6,560,576 B1 | 5/2003 | Cohen | |
| 6,560,590 B1 | 5/2003 | Shwe | |
| 6,567,778 B1 | 5/2003 | Chao Chang | |
| 6,567,797 B1 | 5/2003 | Schuetze | |
| 6,567,805 B1 | 5/2003 | Johnson | |
| 6,570,555 B1 | 5/2003 | Prevost | |
| 6,570,964 B1 | 5/2003 | Murveit | |
| 6,571,279 B1 | 5/2003 | Herz | |
| 6,574,597 B1 | 6/2003 | Mohri | |
| 6,574,624 B1 | 6/2003 | Johnson | |
| 6,578,022 B1 | 6/2003 | Foulger | |
| 6,581,103 B1 | 6/2003 | Dengler | |
| 6,584,439 B1 | 6/2003 | Geilhufe | |
| 6,587,858 B1 | 7/2003 | Strazza | |
| 6,591,239 B1 | 7/2003 | McCall | |
| 6,594,257 B1 | 7/2003 | Doshi | |
| 6,594,367 B1 | 7/2003 | Marash | |
| 6,598,018 B1 | 7/2003 | Junqua | |
| 6,601,026 B2 | 7/2003 | Appelt | |
| 6,604,075 B1 | 8/2003 | Brown | |
| 6,604,077 B2 | 8/2003 | Dragosh | |
| 6,606,598 B1 | 8/2003 | Holthouse | |
| 6,611,692 B2 | 8/2003 | Raffel | |
| 6,614,773 B1 | 9/2003 | Maxemchuk | |
| 6,615,172 B1 | 9/2003 | Bennett | |
| 6,622,119 B1 | 9/2003 | Ramaswamy | |
| 6,629,066 B1 | 9/2003 | Jackson | |
| 6,631,346 B1 | 10/2003 | Karaorman | |
| 6,631,351 B1 | 10/2003 | Ramachandran | |
| 6,633,846 B1 | 10/2003 | Bennett | |
| 6,636,790 B1 | 10/2003 | Lightner | |
| 6,643,620 B1 | 11/2003 | Contolini | |
| 6,647,363 B2 | 11/2003 | Claassen | |
| 6,650,747 B1 | 11/2003 | Bala | |
| 6,658,388 B1 | 12/2003 | Kleindienst | |
| 6,678,680 B1 | 1/2004 | Woo | |
| 6,681,206 B1 | 1/2004 | Gorin | |
| 6,691,151 B1 | 2/2004 | Cheyer | |
| 6,701,294 B1 | 3/2004 | Ball | |
| 6,704,396 B2 | 3/2004 | Parolkar | |
| 6,704,576 B1 | 3/2004 | Brachman | |
| 6,704,708 B1 | 3/2004 | Pickering | |
| 6,707,421 B1 | 3/2004 | Drury | |
| 6,708,150 B1 | 3/2004 | Hirayama | |
| 6,721,001 B1 | 4/2004 | Berstis | |
| 6,721,633 B2 | 4/2004 | Funk | |
| 6,721,706 B1 | 4/2004 | Strubbe | |
| 6,726,636 B2 | 4/2004 | Der Ghazarian | |
| 6,735,592 B1 | 5/2004 | Neumann | |
| 6,739,556 B1 | 5/2004 | Langston | |
| 6,741,931 B1 | 5/2004 | Kohut | |
| 6,742,021 B1 | 5/2004 | Halverson | |
| 6,745,161 B1 | 6/2004 | Arnold | |
| 6,751,591 B1 | 6/2004 | Gorin | |
| 6,751,612 B1 | 6/2004 | Schuetze | |
| 6,754,485 B1 | 6/2004 | Obradovich | |
| 6,754,627 B2 | 6/2004 | Woodward | |
| 6,757,544 B2 | 6/2004 | Rangarajan | |
| 6,757,718 B1 | 6/2004 | Halverson | |
| 6,795,808 B1 | 9/2004 | Strubbe | |
| 6,801,604 B2 | 10/2004 | Maes | |
| 6,801,893 B1 | 10/2004 | Backfried | |
| 6,810,375 B1 | 10/2004 | Ejerhed | |
| 6,813,341 B1 | 11/2004 | Mahoney | |
| 6,816,830 B1 | 11/2004 | Kempe | |
| 6,829,603 B1 | 12/2004 | Wolf | |
| 6,832,230 B1 | 12/2004 | Zilliacus | |
| 6,833,848 B1 | 12/2004 | Wolff | |
| 6,850,603 B1 | 2/2005 | Eberle | |
| 6,856,990 B2 | 2/2005 | Barile | |
| 6,865,481 B2 | 3/2005 | Kawazoe | |
| 6,868,380 B2 | 3/2005 | Kroeker | |
| 6,868,385 B1 | 3/2005 | Gerson | |
| 6,871,179 B1 | 3/2005 | Kist | |
| 6,873,837 B1 | 3/2005 | Yoshioka | |
| 6,877,001 B2 | 4/2005 | Wolf | |
| 6,877,134 B1 | 4/2005 | Fuller | |
| 6,901,366 B1 | 5/2005 | Kuhn | |
| 6,910,003 B1 | 6/2005 | Arnold | |
| 6,912,498 B2 | 6/2005 | Stevens | |
| 6,915,126 B2 | 7/2005 | Mazzara, Jr. | |
| 6,928,614 B1 | 8/2005 | Everhart | |
| 6,934,756 B2 | 8/2005 | Maes | |
| 6,937,977 B2 | 8/2005 | Gerson | |
| 6,937,982 B2 | 8/2005 | Kitaoka | |
| 6,941,266 B1 | 9/2005 | Gorin | |
| 6,944,594 B2 | 9/2005 | Busayapongchai | |
| 6,950,821 B2 | 9/2005 | Faybishenko | |
| 6,954,755 B2 | 10/2005 | Reisman | |
| 6,959,276 B2 | 10/2005 | Droppo | |
| 6,961,700 B2 | 11/2005 | Mitchell | |
| 6,963,759 B1 | 11/2005 | Gerson | |
| 6,964,023 B2 | 11/2005 | Maes | |

(56) References Cited

U.S. PATENT DOCUMENTS

| | | |
|---|---|---|
| 6,968,311 B2 | 11/2005 | Knockeart |
| 6,973,387 B2 | 12/2005 | Masclet |
| 6,975,993 B1 | 12/2005 | Keiller |
| 6,980,092 B1 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,975 B1 | 4/2006 | Pazandak |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | Di Fabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,738 B2 | 3/2009 | Kennewick |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 * | 9/2010 | Vanier ................ H04M 3/4878 |
| | | 379/114.13 |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |

(56) References Cited

U.S. PATENT DOCUMENTS

| | | |
|---|---|---|
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,346,563 B1 | 1/2013 | Hjelm |
| 8,370,147 B2 | 2/2013 | Kennewick |
| 8,447,607 B2 | 5/2013 | Weider |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,589,161 B2 | 11/2013 | Kennewick |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2* | 9/2014 | Pansari .................. G06Q 30/02 370/259 |
| 8,849,791 B1 | 9/2014 | Hertschuh |
| 8,886,536 B2 | 11/2014 | Freeman |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 2001/0039492 A1 | 11/2001 | Nemoto |
| 2001/0041980 A1 | 11/2001 | Howard |
| 2001/0049601 A1 | 12/2001 | Kroeker |
| 2001/0054087 A1 | 12/2001 | Flom |
| 2002/0010584 A1* | 1/2002 | Schultz .................... G06F 3/16 704/270 |
| 2002/0015500 A1 | 2/2002 | Belt |
| 2002/0022927 A1 | 2/2002 | Lemelson |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1* | 6/2002 | Ikeda .................... G06Q 30/02 709/219 |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1* | 10/2002 | Chen ....................... G06Q 30/06 709/202 |
| 2002/0161646 A1* | 10/2002 | Gailey ................. G06F 17/3087 705/14.64 |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0014261 A1 | 1/2003 | Kageyama |
| 2003/0016835 A1 | 1/2003 | Elko |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0088421 A1 | 5/2003 | Maes |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0182132 A1 | 9/2003 | Niemoeller |
| 2003/0187643 A1 | 10/2003 | Van Thong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1* | 2/2004 | Wolton ............. G06F 17/30873 709/202 |
| 2004/0036601 A1 | 2/2004 | Obradovich |
| 2004/0044516 A1 | 3/2004 | Kennewick |
| 2004/0098245 A1 | 5/2004 | Walker |
| 2004/0117179 A1 | 6/2004 | Balasuriya |
| 2004/0117804 A1 | 6/2004 | Scahill |
| 2004/0122674 A1 | 6/2004 | Bangalore |
| 2004/0133793 A1 | 7/2004 | Ginter |
| 2004/0140989 A1 | 7/2004 | Papageorge |
| 2004/0158555 A1 | 8/2004 | Seedman |
| 2004/0166832 A1 | 8/2004 | Portman |
| 2004/0167771 A1 | 8/2004 | Duan |
| 2004/0172247 A1* | 9/2004 | Yoon ..................... G10L 15/187 704/251 |
| 2004/0172258 A1 | 9/2004 | Dominach |
| 2004/0193408 A1 | 9/2004 | Hunt |
| 2004/0193420 A1 | 9/2004 | Kennewick |
| 2004/0199375 A1 | 10/2004 | Ehsani |
| 2004/0205671 A1 | 10/2004 | Sukehiro |
| 2004/0243417 A9 | 12/2004 | Pitts |
| 2004/0247092 A1 | 12/2004 | Timmins |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1 | 4/2005 | Endo |
| 2005/0114116 A1 | 5/2005 | Fiedler |
| 2005/0125232 A1 | 6/2005 | Gadd |
| 2005/0131673 A1 | 6/2005 | Koizumi |

(56) References Cited

U.S. PATENT DOCUMENTS

| | | | |
|---|---|---|---|
| 2005/0137850 A1 | 6/2005 | Odell | |
| 2005/0137877 A1 | 6/2005 | Oesterling | |
| 2005/0143994 A1 | 6/2005 | Mori | |
| 2005/0144013 A1 | 6/2005 | Fujimoto | |
| 2005/0144187 A1 | 6/2005 | Che | |
| 2005/0149319 A1 | 7/2005 | Honda | |
| 2005/0216254 A1 | 9/2005 | Gupta | |
| 2005/0234727 A1 | 10/2005 | Chiu | |
| 2005/0246174 A1 | 11/2005 | DeGolia | |
| 2005/0283364 A1 | 12/2005 | Longe | |
| 2005/0283752 A1 | 12/2005 | Fruchter | |
| 2006/0041431 A1 | 2/2006 | Maes | |
| 2006/0047509 A1 | 3/2006 | Ding | |
| 2006/0072738 A1 | 4/2006 | Louis | |
| 2006/0074671 A1 | 4/2006 | Farmaner | |
| 2006/0100851 A1 | 5/2006 | Schonebeck | |
| 2006/0182085 A1 | 8/2006 | Sweeney | |
| 2006/0206310 A1 | 9/2006 | Ravikumar | |
| 2006/0217133 A1 | 9/2006 | Christenson | |
| 2006/0242017 A1 | 10/2006 | Libes | |
| 2006/0253281 A1 | 11/2006 | Letzt | |
| 2006/0285662 A1 | 12/2006 | Yin | |
| 2007/0033005 A1 | 2/2007 | Cristo | |
| 2007/0033020 A1 | 2/2007 | Francois | |
| 2007/0038436 A1 | 2/2007 | Cristo | |
| 2007/0038445 A1 | 2/2007 | Helbing | |
| 2007/0043569 A1 | 2/2007 | Potter | |
| 2007/0043574 A1 | 2/2007 | Coffman | |
| 2007/0043868 A1 | 2/2007 | Kumar | |
| 2007/0050191 A1 | 3/2007 | Weider | |
| 2007/0055525 A1 | 3/2007 | Kennewick | |
| 2007/0061067 A1 | 3/2007 | Zeinstra | |
| 2007/0061735 A1 | 3/2007 | Hoffberg | |
| 2007/0073544 A1 | 3/2007 | Millett | |
| 2007/0078708 A1 | 4/2007 | Yu | |
| 2007/0078709 A1 | 4/2007 | Rajaram | |
| 2007/0078814 A1* | 4/2007 | Flowers | G06F 17/30684 |
| 2007/0094003 A1 | 4/2007 | Huang | |
| 2007/0112555 A1 | 5/2007 | Lavi | |
| 2007/0112630 A1* | 5/2007 | Lau | G06K 9/72 705/14.1 |
| 2007/0118357 A1 | 5/2007 | Kasravi | |
| 2007/0124057 A1 | 5/2007 | Prieto | |
| 2007/0135101 A1 | 6/2007 | Ramati | |
| 2007/0146833 A1 | 6/2007 | Satomi | |
| 2007/0162296 A1 | 7/2007 | Altberg | |
| 2007/0174258 A1* | 7/2007 | Jones | G06Q 30/02 |
| 2007/0179778 A1 | 8/2007 | Gong | |
| 2007/0185859 A1* | 8/2007 | Flowers | G06F 17/30864 |
| 2007/0186165 A1 | 8/2007 | Maislos | |
| 2007/0192309 A1* | 8/2007 | Fischer | G06F 17/30684 |
| 2007/0198267 A1 | 8/2007 | Jones | |
| 2007/0203736 A1 | 8/2007 | Ashton | |
| 2007/0208732 A1* | 9/2007 | Flowers | G06F 17/30867 |
| 2007/0214182 A1 | 9/2007 | Rosenberg | |
| 2007/0250901 A1 | 10/2007 | McIntire | |
| 2007/0265850 A1 | 11/2007 | Kennewick | |
| 2007/0266257 A1 | 11/2007 | Camaisa | |
| 2007/0276651 A1 | 11/2007 | Bliss | |
| 2007/0299824 A1 | 12/2007 | Pan | |
| 2008/0034032 A1 | 2/2008 | Healey | |
| 2008/0046311 A1 | 2/2008 | Shahine | |
| 2008/0059188 A1 | 3/2008 | Konopka | |
| 2008/0065386 A1 | 3/2008 | Cross | |
| 2008/0065389 A1* | 3/2008 | Cross | G10L 21/00 704/270 |
| 2008/0091406 A1 | 4/2008 | Baldwin | |
| 2008/0103761 A1* | 5/2008 | Printz | G06Q 30/02 704/9 |
| 2008/0103781 A1 | 5/2008 | Wasson | |
| 2008/0104071 A1 | 5/2008 | Pragada | |
| 2008/0109285 A1 | 5/2008 | Reuther | |
| 2008/0115163 A1 | 5/2008 | Gilboa | |
| 2008/0133215 A1 | 6/2008 | Sarukkai | |
| 2008/0140385 A1 | 6/2008 | Mahajan | |
| 2008/0147396 A1 | 6/2008 | Wang | |
| 2008/0147410 A1 | 6/2008 | Odinak | |
| 2008/0154604 A1 | 6/2008 | Sathish | |
| 2008/0162471 A1 | 7/2008 | Bernard | |
| 2008/0177530 A1 | 7/2008 | Cross | |
| 2008/0189110 A1 | 8/2008 | Freeman | |
| 2008/0235023 A1 | 9/2008 | Kennewick | |
| 2008/0235027 A1 | 9/2008 | Cross | |
| 2008/0294437 A1 | 11/2008 | Nakano | |
| 2008/0294994 A1 | 11/2008 | Kruger | |
| 2008/0319751 A1 | 12/2008 | Kennewick | |
| 2009/0006077 A1 | 1/2009 | Keaveney | |
| 2009/0024476 A1 | 1/2009 | Baar | |
| 2009/0052635 A1 | 2/2009 | Jones | |
| 2009/0067599 A1 | 3/2009 | Agarwal | |
| 2009/0076827 A1 | 3/2009 | Bulitta | |
| 2009/0106029 A1 | 4/2009 | DeLine | |
| 2009/0117885 A1 | 5/2009 | Roth | |
| 2009/0144131 A1* | 6/2009 | Chiu | G06Q 30/02 704/270 |
| 2009/0144271 A1 | 6/2009 | Richardson | |
| 2009/0150156 A1 | 6/2009 | Kennewick | |
| 2009/0171664 A1 | 7/2009 | Kennewick | |
| 2009/0216540 A1 | 8/2009 | Tessel | |
| 2009/0248605 A1 | 10/2009 | Mitchell | |
| 2009/0259646 A1 | 10/2009 | Fujita | |
| 2009/0265163 A1 | 10/2009 | Li | |
| 2009/0271194 A1 | 10/2009 | Davis | |
| 2009/0273563 A1 | 11/2009 | Pryor | |
| 2009/0276700 A1 | 11/2009 | Anderson | |
| 2009/0287680 A1 | 11/2009 | Paek | |
| 2009/0299745 A1 | 12/2009 | Kennewick | |
| 2009/0299857 A1 | 12/2009 | Brubaker | |
| 2009/0304161 A1 | 12/2009 | Pettyjohn | |
| 2009/0307031 A1 | 12/2009 | Winkler | |
| 2009/0313026 A1 | 12/2009 | Coffman | |
| 2010/0023320 A1 | 1/2010 | Di Cristo | |
| 2010/0029261 A1 | 2/2010 | Mikkelsen | |
| 2010/0036967 A1 | 2/2010 | Caine | |
| 2010/0049501 A1 | 2/2010 | Kennewick | |
| 2010/0049514 A1 | 2/2010 | Kennewick | |
| 2010/0057443 A1 | 3/2010 | Cristo | |
| 2010/0063880 A1 | 3/2010 | Atsmon | |
| 2010/0064025 A1 | 3/2010 | Nelimarkka | |
| 2010/0094707 A1 | 4/2010 | Freer | |
| 2010/0145700 A1 | 6/2010 | Kennewick | |
| 2010/0185512 A1 | 7/2010 | Borger | |
| 2010/0204986 A1 | 8/2010 | Kennewick | |
| 2010/0204994 A1 | 8/2010 | Kennewick | |
| 2010/0217604 A1 | 8/2010 | Baldwin | |
| 2010/0286985 A1 | 11/2010 | Kennewick | |
| 2010/0299142 A1 | 11/2010 | Freeman | |
| 2010/0312566 A1 | 12/2010 | Odinak | |
| 2010/0331064 A1 | 12/2010 | Michelstein | |
| 2011/0022393 A1 | 1/2011 | Waller | |
| 2011/0106527 A1 | 5/2011 | Chiu | |
| 2011/0112827 A1 | 5/2011 | Kennewick | |
| 2011/0112921 A1 | 5/2011 | Kennewick | |
| 2011/0119049 A1 | 5/2011 | Ylonen | |
| 2011/0131036 A1 | 6/2011 | DiCristo | |
| 2011/0131045 A1 | 6/2011 | Cristo | |
| 2011/0231182 A1 | 9/2011 | Weider | |
| 2011/0231188 A1 | 9/2011 | Kennewick | |
| 2011/0307167 A1* | 12/2011 | Taschereau | G06Q 30/0241 379/88.01 |
| 2012/0022857 A1 | 1/2012 | Baldwin | |
| 2012/0046935 A1 | 2/2012 | Nagao | |
| 2012/0101809 A1 | 4/2012 | Kennewick | |
| 2012/0101810 A1 | 4/2012 | Kennewick | |
| 2012/0109753 A1 | 5/2012 | Kennewick | |
| 2012/0150620 A1 | 6/2012 | Mandyam | |
| 2012/0150636 A1 | 6/2012 | Freeman | |
| 2012/0239498 A1 | 9/2012 | Ramer | |
| 2012/0278073 A1 | 11/2012 | Weider | |
| 2013/0006734 A1 | 1/2013 | Ocko | |
| 2013/0054228 A1 | 2/2013 | Baldwin | |
| 2013/0060625 A1 | 3/2013 | Davis | |
| 2013/0080177 A1 | 3/2013 | Chen | |
| 2013/0211710 A1 | 8/2013 | Kennewick | |

(56) References Cited

U.S. PATENT DOCUMENTS

| | | | |
|---|---|---|---|
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0339022 A1 | 12/2013 | Baldwin |
| 2014/0006951 A1 | 1/2014 | Hunter |
| 2014/0012577 A1 | 1/2014 | Freeman |
| 2014/0108013 A1 | 4/2014 | Cristo |
| 2014/0156278 A1 | 6/2014 | Kennewick |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0288934 A1 | 9/2014 | Kennewick |
| 2014/0365222 A1 | 12/2014 | Weider |
| 2015/0019217 A1 | 1/2015 | Cristo |
| 2015/0019227 A1 | 1/2015 | Anandarajah |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0228276 A1 | 8/2015 | Baldwin |
| 2015/0348544 A1 | 12/2015 | Baldwin |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |

FOREIGN PATENT DOCUMENTS

| | | |
|---|---|---|
| JP | 2001071289 | 3/2001 |
| JP | 2006146881 | 6/2006 |
| JP | 2008058465 | 3/2008 |
| JP | 2008139928 | 6/2008 |
| JP | 2011504304 | 2/2011 |
| WO | 9946763 | 9/1999 |
| WO | 0021232 | 1/2000 |
| WO | 0046792 | 1/2000 |
| WO | 0178065 | 10/2001 |
| WO | 2004072954 | 1/2004 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2008027454 | 2/2008 |
| WO | 2009075912 | 1/2009 |
| WO | 2009145796 | 1/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Wu, Su-Lin, et al. "Incorporating information from syllable-length time scales into automatic speech recognition." Acoustics, Speech and Signal Processing, 1998. Proceedings of the 1998 IEEE International Conference on. vol. 2. IEEE, 1998.*

Kirchhoff, Katrin. "Syllable-level desynchronisation of phonetic features for speech recognition." Spoken Language, 1996. ICSLP 96. Proceedings., Fourth International Conference on. vol. 4. IEEE, 1996.*

"Statement in Accordance with the Notice from the European Patent Office" dated Oct. 1, 2007 Concerning Business Methods (OJ EPO Nov. 2007, 592-593), XP002456252.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., The Network Vehicle—A Glimpse into the Future of Mobile Multi-Media, IEEE Aerosp. Electron. Systems Magazine, vol. 14, No. 9, Sep. 1999, pp. 27-32.

Mao, Mark Z., "Automatic Training Set Segmentation for Multi-Pass Speech Recognition", Department of Electrical Engineering, Stanford University, CA, copyright 2005, IEEE, pp. I-685 to I-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Zhao, Yilin, "Telematics: Safe and Fun Driving", IEEE Intelligent Systems, vol. 17, Issue 1, 2002, pp. 10-14.

* cited by examiner

SYSTEM AND METHOD FOR DELIVERING TARGETED ADVERTISEMENTS AND/OR PROVIDING NATURAL LANGUAGE PROCESSING BASED ON ADVERTISEMENTS

CROSS-REFERENCE TO RELATED APPLICATIONS

This application is a continuation of U.S. patent application Ser. No. 14/537,598, entitled "System and Method for Delivering Targeted Advertisements and/or Providing Natural Language Processing Based on Advertisements," filed Nov. 10, 2014, which is a continuation of U.S. patent application Ser. No. 14/016,757, entitled "System and Method for Delivering Targeted Advertisements and Tracking Advertisement Interactions in Voice Recognition Context," filed Sep. 3, 2013 (which issued as U.S. Pat. No. 8,886,536 on Nov. 11, 2014), which is a continuation of U.S. patent application Ser. No. 13/371,870, entitled "System and Method for Delivering Target Advertisements and Tracking Advertisement Interactions in Voice Recognition Context," filed Feb. 13, 2012 (which issued as U.S. Pat. No. 8,527,274 on Sep. 3, 2013), which is a continuation of U.S. patent application Ser. No. 12/847,564, entitled "System and Method for Selecting and Presenting Advertisements Based on Natural Language Processing of Voice-Based Input," filed Jul. 30, 2010 (which issued as U.S. Pat. No. 8,145,489 on Mar. 27, 2012), which is a continuation of U.S. patent application Ser. No. 11/671,526, entitled "System and Method for Selecting and Presenting Advertisements Based on Natural Language Processing of Voice-Based Input," filed Feb. 6, 2007 (which issued as U.S. Pat. No. 7,818,176 on Oct. 19, 2010), the contents of which are hereby incorporated by reference in their entirety.

FIELD OF THE INVENTION

The present invention relates to delivering targeted advertisements and/or processing natural language processing based on advertisements.

BACKGROUND OF THE INVENTION

As technology advances, consumer electronics devices tend to play larger roles due to increased functionality and mobility. For example, mobile phones, navigation devices, embedded devices, and other such devices provide a wealth of functionality beyond core applications. However, increased functionality adds difficulty to the learning curve associated with using electronic devices, and increased mobility intensifies the demand for simple mechanisms to interact with devices on the go. For example, existing systems tend to have complex human to machine interfaces, which may inhibit mass-market adoption for various technologies. For example, when a user wishes to perform a relatively simple task on a mobile phone, such as purchasing a ring tone, the user often is forced to navigate through a series of menus and press a series of buttons. In some instances, this may result in the transaction not necessarily occurring, as the user may prefer to avoid the hassles altogether. As such, there is ever-growing demand for ways to exploit technology in intuitive ways.

Voice recognition software may enable a user to exploit applications and features of a device that may otherwise be unfamiliar, unknown, or difficult to use. However, many existing voice user interfaces (when they actually work) still require significant learning on the part of the user. For example, users often cannot directly issue a request for a system to retrieve information or perform an action without having to memorize specific syntaxes, words, phrases, concepts, semantic indicators, or other keywords/qualifiers. Similarly, when users are uncertain of particular needs, many existing systems do not engage the user in a productive, cooperative dialogue to resolve requests and advance a conversation. Instead, many existing speech interfaces force users to use a fixed set commands or keywords to communicate requests in ways that systems can understand. Using existing voice user interfaces, there is virtually no option for dialogue between the user and the system to satisfy mutual goals.

The lack of adequate voice user interfaces results in missed opportunities for providing valuable and relevant information to users. Not only does this potentially leave user requests unresolved, in certain instances, providers of goods and services may lose out on potential business. In an increasingly global marketplace, where marketers are continually looking for new and effective ways to reach consumers, the problems with existing voice user interfaces leaves a large segment of consumer demand unfulfilled. Furthermore, existing techniques for marketing, advertising, or otherwise calling consumers to action fail to effectively utilize voice-based information, which is one of the most natural, intuitive methods of human interaction.

Existing systems suffer from these and other problems.

SUMMARY OF THE INVENTION

According to various aspects of the invention, a system and method for selecting and presenting advertisements based on natural language processing of voice-based inputs is provided. A natural language voice-based input may be received by a voice user interface. The voice-based input may include a user utterance, and a request may be identified from the utterance. Appropriate action may be taken to service the request, while one or more advertisements may be selected and presented to the user. Advertisements may be selected based on various criteria, including content of the input (e.g., concepts, semantic indicators, etc.), an activity related to the input (e.g., a relation to a request, a requested application, etc.), user profiles (e.g., demographics, preferences, location, etc.), or in other ways. A user may subsequently interact with the advertisement (e.g., via a voice-based input), and action may be taken in response to the interaction. Furthermore, the interaction may be tracked to build statistical profiles of user behavior based on affinities or clusters among advertisements, user profiles, contexts, topics, semantic indicators, concepts, or other criteria.

According to various aspects of the invention, advertisers may create advertisements, which may be stored in an advertisement repository. For example, advertisements may include sponsored messages, calls to action, purchase opportunities, trial downloads, or any other marketing communication, as would be apparent to those skilled in the art. Advertisers may specify various parameters to associate with the advertisements, such as various contexts or topic concepts (e.g., semantic indicators for a "music" concept may include words such as "music," "tunes," "songs," etc.), target demographics (e.g., a preferred audience), marketing criteria or prices for insertion (e.g., dynamic or static pricing based on various marketing criteria), or other information, as would be apparent. The advertisement repository may be associated with a server, where in response to a voice-based input from a user (e.g., at a voice-enabled device), a communications link may be established with the server. Information may be extracted from the voice-based input (e.g., words in the input, applications requested by the input, etc.), and the extracted"

information may be correlated with user profiles, advertisement parameters, or other information to determine which advertisements to select in relation to the voice-based input. The server may subsequently communicate the selected advertisements to the user, and the server may track the user's subsequent interaction with the selected advertisements.

Other objects and advantages of the invention will be apparent based on the following drawings and detailed description.

DETAILED DESCRIPTION

Figure 1:
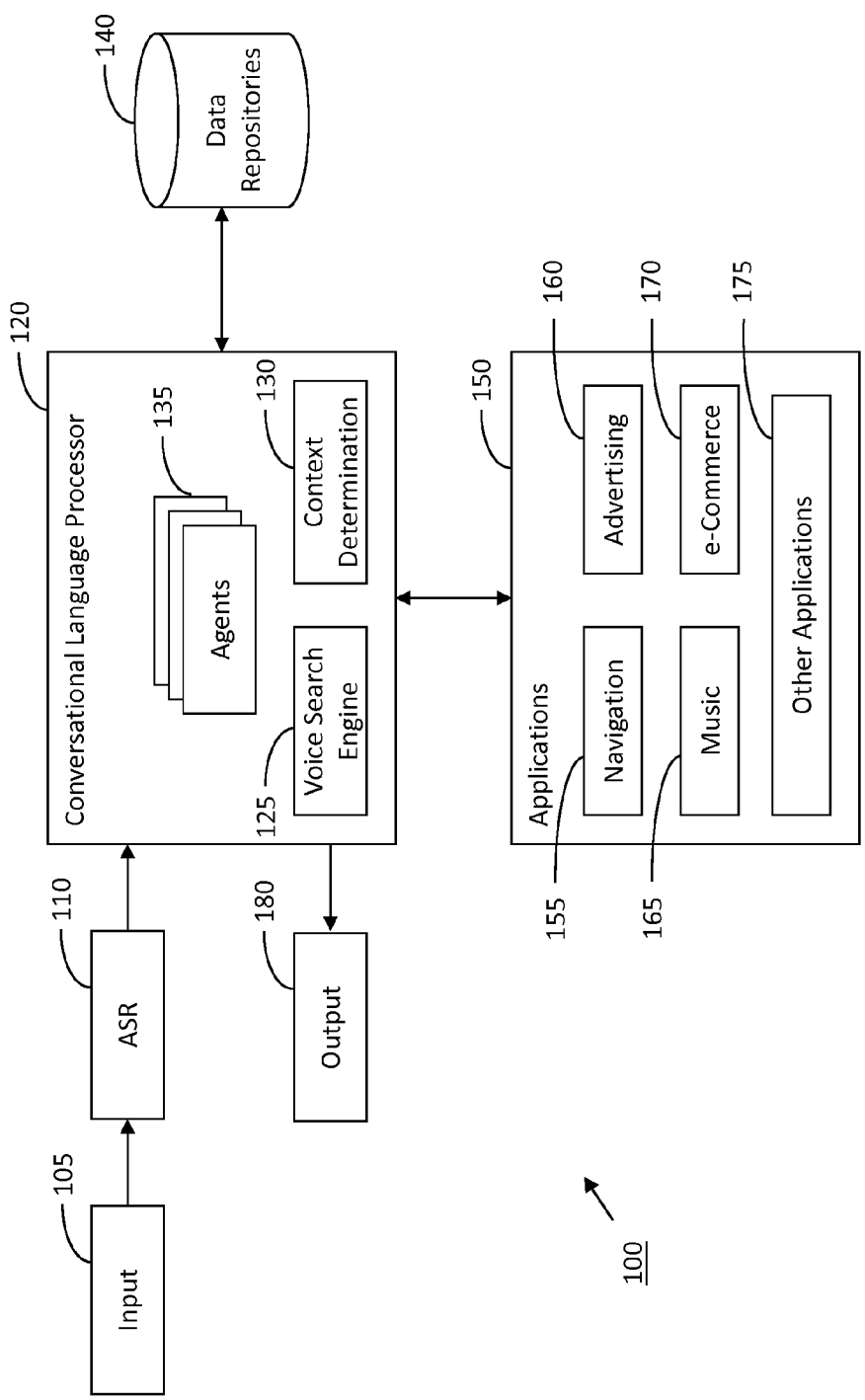
FIG. 1 illustrates a block diagram of an exemplary system for implementing a voice user interface according to various aspects of the invention.

Referring to FIG. 1, an exemplary system 100 for implementing a voice user interface is illustrated according to various aspects of the invention. System 100 may enable users to perform various tasks on a voice-enabled device. For example, users may control navigation devices, media devices, personal computers, personal digital assistants, or any other device supporting voice-based inputs. System 100 may enable users to request voice-enabled devices to retrieve information or perform various tasks, among other things, using natural language voice-based inputs. For example, system 100 may interpret natural language voice-based inputs and generate responses using, among other things, techniques described in U.S. patent application Ser. No. 10/452,147, entitled "Systems and Methods for Responding to Natural Language Speech Utterance," filed Jun. 3, 2003, which issued as U.S. Pat. No. 7,398,209 on Jul. 8, 2008, and U.S. patent application Ser. No. 10/618,633, entitled "Mobile Systems and Methods for Responding to Natural Language Speech Utterance," filed Jun. 15, 2003, which issued as U.S. Pat. No. 7,693,720 on Apr. 6, 2010, both of which are hereby incorporated by reference in their entirety. For example, as described in U.S. patent application Ser. No. 10/452,147, the system 100 may include a speech recognition engine (e.g., an Automatic Speech Recognizer 110) that may recognize words and phrases in an utterance using entries in one or more dictionary and phrase tables. In addition, as further described therein, fuzzy set possibilities or prior probabilities for the words in the dictionary and phrase tables may be dynamically updated to maximize the probability of correct recognition at each stage of the dialog (e.g., the probabilities or possibilities may be dynamically updated based on application domains, questions or commands, contexts, user profiles and preferences, user dialog histories, recognizer dictionary and phrase tables, word spellings, and/or other criteria).

According to various aspects of the invention, system 100 may receive a user input, including at least a voice-based user utterance, at an input device 105. Input device 105 may include any suitable device, or combination of devices, for receiving a voice-based input (e.g., a microphone). In various implementations, input device 105 may include a multi-modal input, such as a touch-screen interface, keypad, or other input. The received utterance may be processed by the Automatic Speech Recognizer 110. Automatic Speech Recognizer 110 may generate one or more preliminary interpretations of the utterance using various techniques. For example, Automatic Speech Recognizer 110 may interpret the utterance using techniques of phonetic dictation to recognize a stream of phonemes. Further, Automatic Speech Recognizer 110 may perform post-processing to enhance the preliminary interpretations. For example, Automatic Speech Recognizer 110 may vary interpretations of an utterance, or components of an utterance, from one context to another. Other techniques for enhancing an interpretation of a user utterance may be used, such as those described in U.S. patent application Ser. No. 11/513,269, entitled "Dynamic Speech Sharpening," filed Aug. 31, 2006, which issued as U.S. Pat. No. 7,634,409 on Dec. 15, 2009, and which is hereby incorporated by reference in its entirety.

The one or more preliminary interpretations may be provided to a conversational language processor 120. Conversational language processor 120 may include a voice search engine 125, a context determination module 130, and one or more agents 135, among other things, to enable cooperative, conversational interaction between the user and system 100. Conversational language processor 120 may be communicatively coupled to one or more data repositories 140 and one or more applications 150. Conversational language processor 120 may generate a domain-specific conversational response, which may be returned to the user as an output 180. Output 180 may include a multi-modal output (e.g., by simultaneously returning a voice-based response and displaying information on a display device).

System 100 may further include an interaction with one or more applications 150 to service one or more requests in the utterance. For example, the utterance may include one or more requests for performing an action, retrieving information, or various combinations thereof. Output 180 may include a conversational response to advance a conversation to service requests by invoking one or more applications 150, as appropriate. For example, applications 150 may include a navigation application 155, an advertising application 160, a music application, an electronic commerce application 170, and/or other applications 175. Furthermore, Automatic Speech Recognizer 110, conversational language processor 120, data repositories 140, and/or applications 150 may reside locally (e.g., on a user device), remotely (e.g., on a server), and/or hybrid local/remote processing models may be used (e.g., lightweight applications may be processed locally while computationally intensive applications may be processed remotely).

Conversational language processor 120 may build long-term and/or short-term shared knowledge in one or more knowledge sources. For example, shared knowledge sources may include information about previous utterances, requests, and other user interactions to inform generating an appropriate response to a current utterance. The shared knowledge may include public/non-private (i.e., environmental) knowledge, as well as personal/private (i.e., historical) knowledge. For example, conversational language processor 120 may use context determination module 130 to establish a context for a current utterance by having domain agents 135 competitively generate a context-based interpretation of the utterance (e.g., by scoring possible interpretations and selecting a highest scoring interpretation). As such, agents 135 may model various domains (e.g., navigation, music, a specific user, global users, advertising, e-commerce, etc.), and conversational language processor 120 may interpret and/or respond to a voice-based input accordingly. For example, context-based interpretations and responses to a voice-based input may be generated using techniques described in U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009, and U.S. patent application Ser. No. 11/212,693, entitled "Mobile Systems and Methods of Supporting Natural Language Human-Machine Interactions," filed Aug. 29, 2005, which issued as U.S. Pat. No. 7,949,529 on May 24, 2011, both of which are hereby incorporated by reference in their entirety.

Furthermore, conversational language processor 120 may support adaptive misrecognition to reinterpret a current utterance and/or one or more previous utterances. For example, information contained in a current utterance may indicate that interpretations for one or more previous utterances were incorrect, and therefore, the previous utterances may be reinterpreted to improve subsequent interpretations. Accordingly, conversational language processor 120 may use the techniques described herein, along with various other techniques, to interpret and respond to conversational, natural language utterances. Conversational language processor 120 may use various other techniques as will be apparent, such as those described in U.S. patent application Ser. No. 11/200,164, entitled "System and Method of Supporting Adaptive Misrecognition in Conversational Speech," filed Aug. 10, 2005, which issued as U.S. Pat. No. 7,620,549 on Nov. 17, 2009, and U.S. patent application Ser. No. 11/580,926, entitled "System and Method for a Cooperative Conversational Voice User Interface," filed Oct. 16, 2006, which issued as U.S. Pat. No. 8,073,681 on Dec. 6, 2011, both of which are hereby incorporated by reference in their entirety. For example, as described in U.S. patent application Ser. No. 11/200,164, an environmental model may be accessed to determine user location, user activity, track user actions, and/or other environmental information to invoke context, domain knowledge, preferences, and/or other cognitive qualities to enhance the interpretation of questions and/or commands. In addition, as further described therein, based on information received from a general cognitive model, the environmental model, and/or a personalized cognitive model, which provide statistical abstracts of user interaction patterns, the system 100 may enhance responses to commands and questions by including a prediction of user behavior.

Figure 2:
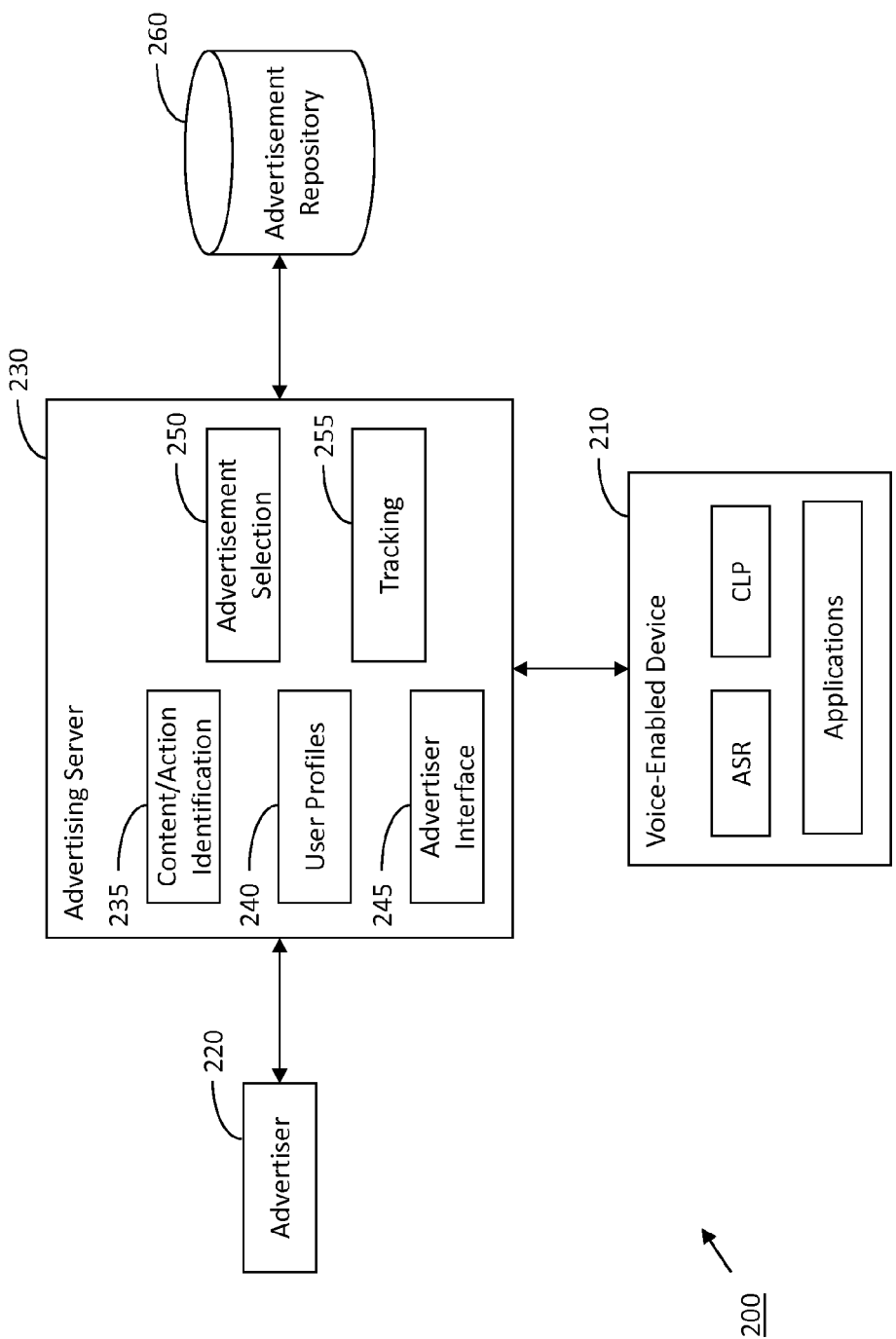
FIG. 2 illustrates a block diagram of an exemplary advertising system according to various aspects of the invention.

Referring to FIG. 2, an exemplary advertising system 200 is illustrated according to various aspects of the invention. System 200 may include a server 230 for receiving one or more advertisements from an advertiser 220, wherein the advertisements may be stored in a data repository 260 associated with server 230. For example, advertisements may include sponsored messages or marketing communications, calls to action, purchase opportunities, trial downloads, coupons, or any other suitable marketing, advertising, campaign, or other information, as would be apparent to those skilled in the art. A voice-enabled device 210 may receive a voice-based input and establish communications with advertising server 230. Subsequently, advertising server 230 may select one or more advertisements from among the advertisements stored in data repository 260, and the selected advertisements may be provided to the voice-enabled device for presentation to a user.

Advertiser 220 may access advertising server 230 via an advertiser interface 245. Advertisers 220 may upload targeted advertisements to server 230 via advertiser interface 245, and server 230 may store the advertisements in data repository 260. The advertisements may include graphically-based advertisements that include banners, images, audio, video, or any suitable combination thereof. Furthermore, the advertisements may include interactive or embedded information, such as links, metadata, or computer-executable instructions, or any suitable combination thereof. Advertisers may specify criteria for a campaign or targeting information for an advertisement (e.g., a start date, an end date, budget information, geo-targeting information, conceptual or contextual information, or any other suitable criteria), which may be used to facilitate selecting an advertisement in relation to a particular voice-based input.

In addition to providing interface 245 for advertisers, server 230 may include a content/action identification module 235, a user profile module 240, an advertisement selection module 250, and a tracking module 255. Users may submit voice-based requests to voice-enabled device 210, and voice-enabled device 210 may communicate information about the voice-based input to server 230. Server 230 may invoke advertisement selection module 250 to extract relevant information from the voice-based input, where advertisement selection module 250 may select one or more advertisements relevant to the voice-based input based on information extracted using content/action identification module 235 and/or user profile module 240.

For example, content/action identification module 235 may identify content of the voice-based input (e.g., words in the input), requested information (e.g., search results, a web page, music, video, graphics, or other information), requested actions (e.g., calculating a navigation route, placing a telephone call, playing a song, etc.), a category or topic related to the input (e.g., music, business, stocks, sports, navigation, movies, etc.), or other criteria to use in selecting an advertisement. Further, user profile module 240 may identify characteristics of a specific user (e.g., demographics, personal preferences, location-based information, etc.), global user profiles (e.g., demographic profiles, click-through rates, etc.), or other criteria to use in selecting an advertisement. Moreover, advertisement selection module 250 may account for where a request originates from. For example, advertisements may be selected based on a default user location (e.g., identified from a user profile), current geolocation information (e.g., identified from a navigation device), whether an affiliate or partner of server 230 initiated the request, or other criteria.

For instance, a user may request airline reservations via voice-enabled device 210, and content/action identification module 235 may identify specific words used in the request, a category related to the request (e.g., travel, airlines, hotels, etc.), or other information. Furthermore, user profile module 240 may identify relevant characteristics of the user (e.g., user-specific demographics, location information, preferred airlines or hotels, etc.), as well as global user characteristics (e.g., most popular airlines). In various implementations, advertisements may be selected by assigning a score to each advertisement (e.g., based on click-through rates, relevance metrics, target audiences, etc.). As such, advertisement selection module 250 may correlate the information about the request to select advertisements stored in data repository 260, and server 230 may communicate the selected advertisements to voice-enabled device 210. Furthermore, selected advertisements may be presented according to a predetermined ordering or ranking (e.g., based on a ranking of relevance to an advertisement).

In various implementations, advertisement selection module 250 may retrieve a predetermined number of advertisements for any given request. Furthermore, the selected advertisements may depend upon a presentation format. For example, advertisements may be selected based on an amount of available space on a display of voice-enabled device 210 and/or a size/shape of the selected advertisements. In another example, voice-based advertisements may be selected and presented to the user audibly (e.g., a "hands-free" advertisement may be preferred when voice-enabled device 210 is a telematics device).

Furthermore, the user's subsequent interaction with an advertisement may be tracked using tracking module 255. For example, tracking module 255 may determine whether a conversion or click-through occurs for each advertisement presented to users. Further, tracking module 255 may maintain accounting and/or billing information associated with advertisers 220. For example, advertisers 220 may specify a maximum insertion cost, a cost-per-click-through, an average insertion cost, or other criteria specifying a budget constraint for an advertisement. As such, tracking module 255 may track which advertisements are selected and/or presented, which advertisements result in a conversion or click-through, whether a click-through or conversion results in a transaction or sale, associations between advertisements and users, requests, concepts, semantic indicators, and/or other criteria. For example, tracking user interaction with advertisements may be used to build user-specific and/or global statistical profiles that map or cluster advertisements to topics, semantic indicators, contexts, concepts, etc. based on user behavior, demographics, targeting constraints, content of advertisements, content of requests, actions associated with requests, or other statistically relevant information. Accordingly, the tracking information may be used to bill or invoice advertisers 220, as well as to improve subsequent performance and relevance of advertisements selected using advertisement selection module 250. Other techniques and features of selecting and presenting advertisements based on voice-based inputs may suitably be employed, as would be apparent.

Figure 3:
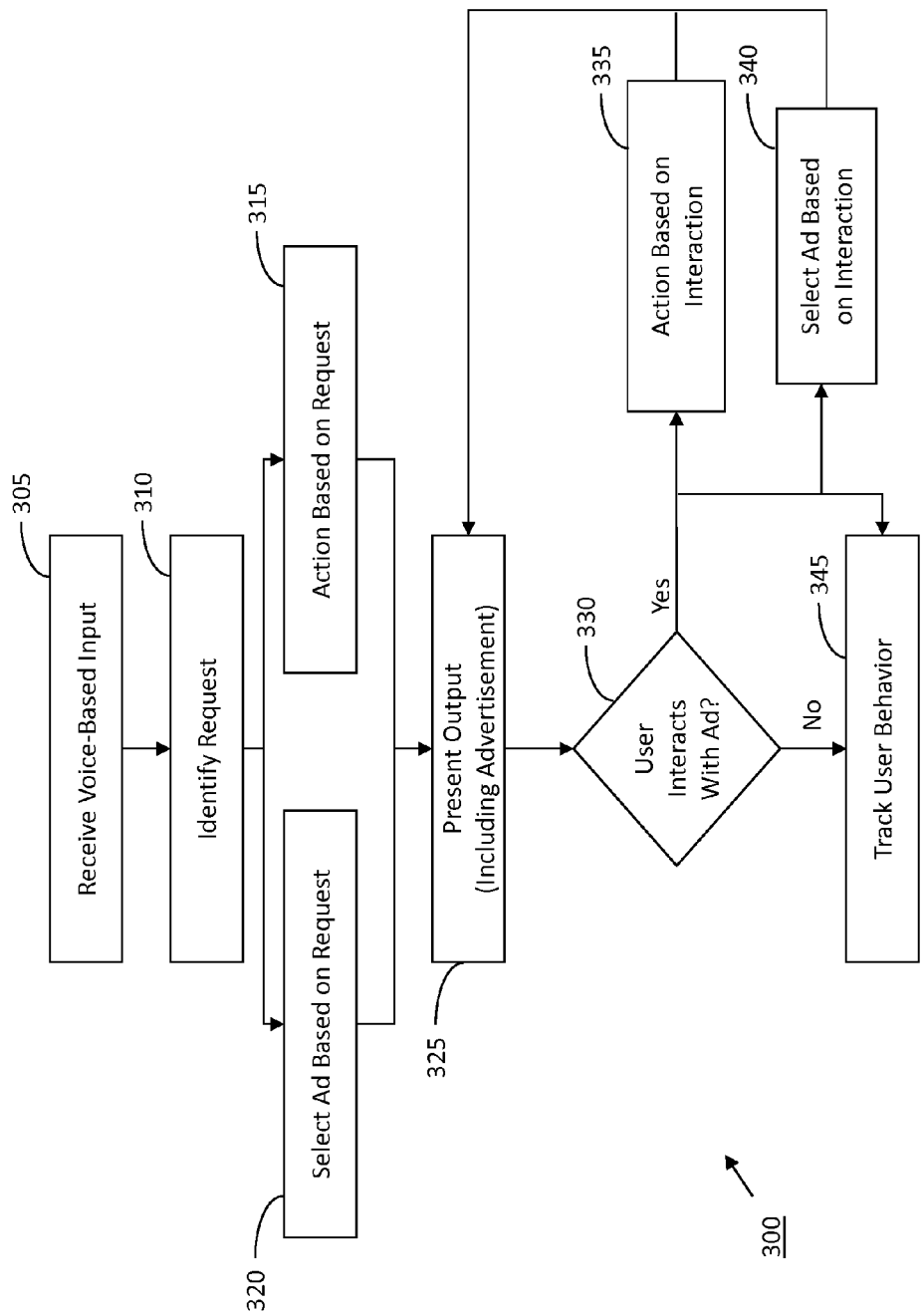
FIG. 3 illustrates a flow diagram of an exemplary method for selecting and presenting advertisements based on voice-based inputs according to various aspects of the invention.

Referring to FIG. 3, an exemplary method for selecting and presenting advertisements based on a voice-based input is illustrated according to various aspects of the invention. The method may begin in an operation 305, where a voice-based input, including at least a user utterance, may be received at a voice user interface. The voice user interface may include any suitable mechanism for receiving the utterance (e.g., a microphone), and may interface with any suitable voice-enabled device, as would be apparent, including personal navigation devices, personal digital assistants, media devices, telematics devices, personal computers, mobile phones, or others.

Subsequently, one or more requests included in the voice-based input may be identified in an operation 310. For example, the requests may include requests to retrieve information, perform tasks, explore or gather information, or otherwise interact with a system or device. For example, a voice-based input to a navigation device may include a request to calculate a route or retrieve location-based information. In another example, a voice-based input to a mobile phone may include a request to place a telephone call, purchase a ringtone, or record a voice-memo. Furthermore, in various implementations, voice-based inputs may include multiple requests, multi-modal requests, cross-device requests, cross-application requests, or other types of requests. For example, an utterance received in operation 305 may be: "Get me a route to Chang's Restaurant, and call them so I can make a reservation." The utterance may thus include multiple requests, including cross-device requests (e.g., calculate a route using a navigation device, and make a telephone call using a mobile phone), as well as cross-application requests (e.g., search for an address and/or phone number using a voice search engine, and calculate a route using a navigation application).

The requests may be part of a conversational interaction between a user and a system or device, whereby an interpretation of requests in a current utterance may be based upon previous utterances in a current conversation, utterances in previous conversations, context-based information, local and/or global user profiles, or other information. For example, a previous request may be reinterpreted based on information included in subsequent requests, a current request may be interpreted based on information included in previous requests, etc. Furthermore, the conversational interaction may take various forms, including query-based conversations, didactic conversations, exploratory conversations, or other types of conversations. For example, the conversational language processor may identify a type of conversation, and information may be extracted from the utterance accordingly to identify the one or more requests in operation 310. Moreover, the conversational language processor may determine whether any of the requests are incomplete or ambiguous, and action may be taken accordingly (e.g., a system response may prompt a user to clarify an incomplete and/or ambiguous request). The conversational language processor may therefore use various techniques to identify a conversation type, interpret utterances, identify requests, or perform other tasks, such as those described in the aforementioned U.S. Patent Applications and U.S. Patents, which are hereby incorporated by reference in their entirety.

Upon identifying the one or more requests, action may be taken based on the identified requests in an operation 315, while one or more advertisements may be selected in an operation 320 (described in greater detail below). For example, one or more context-appropriate applications may be invoked to service the requests in operation 315 (e.g., a voice search engine, a navigation application, an electronic commerce application, or other application may be invoked depending upon the request). Furthermore, in operation 320, information may be communicated to an advertising server to select one or more advertisements related to the request. Thus, as shown in FIG. 3, taking action in operation 315 and selecting advertisements in operation 320 may be related operations (e.g., advertisements may be selected to help in interpreting incomplete and/or ambiguous requests).

Upon taking action in operation 315 (e.g., to service the request) and selecting one or more advertisements in operation 320 (e.g., in relation to the request), an output may be presented to the user in operation 325. The output may indicate a result of the action associated with operation 315. For example, the output may include requested information, an indication of whether a requested task was successfully completed, whether additional information is needed to service the request (e.g., including a prompt for the information), or other information relating to an action based on the request. Furthermore, the output may include advertisements, as selected in operation 320. For example, the output may include text-based, graphic-based, video-based, audio-based, or other types of advertisements, as would be apparent to those skilled in the art. Further, the output may include other types of advertisements, including calls to action (e.g., a location-based coupon or purchase opportunity, trial downloads, or other actionable advertising or marketing).

Advertisements may be selected in relation to a request based on various criteria. For example, an advertisement may be selected based on words or other content of the request, relevant words or content related to the words or content of the request, etc. In another example, the advertisement may be selected based on requested tasks/information (e.g., a request for movie showtimes may result in an advertisement being selected for a particular theater). In yet another example, the advertisement may be selected based on a topic or category associated with the requested tasks/information (e.g., a request to purchase airline tickets may result in an advertisement being selected for a hotel in a destination associated with a reserved flight). In still other examples, the advertisement may be selected based on location information, (e.g., advertisements may be selected based on a proximity to a user geolocation identified using a navigation device), user-specific and/or global user profiles (e.g., advertisements may be selected based on user-specific and/or global preferences, advertiser campaign criteria, etc.).

Content of a voice-based input may be determined based on various criteria, including contextual or conceptual information (e.g., semantic indicators, qualifiers, or other information). For example, a given concept may include various semantically equivalent indicators having an identical meaning. Thus, for instance, a voice-based input may be "Play some tunes!" or "Play some music!" or other variants thereof, each of which may be interpreted as relating to a specific idea (or concept) of "Music." Thus, concept or content information in a request may be used to select an advertisement. For example, a user may request to calculate a route in Seattle, Wash. (e.g., "How do I get to the Space Needle?"). Based on a context of the requested task (e.g., "Navigation," "Seattle," etc.), a voice search engine may retrieve an address of the Space Needle and a navigation application may calculate the route. Furthermore, user profile information may indicate that the user is visiting Seattle from out-of-town (e.g., the profile may indicate that the user's home is Sacramento), and therefore, an advertisement for popular points-of-interest in Seattle may be selected. In another example, the user may request information about a sporting event (e.g., "Get me the kickoff time for the Eagles game on Sunday"). Based on a context of the requested information (e.g., "Search," "Sports," "Philadelphia," etc.), the requested information may be retrieved, while an advertisement for Eagles apparel or memorabilia may be selected.

In various instances, concepts, semantic indicators, qualifiers, or other information included in, or inferred from, a request may indicate an exploratory nature for the request. In other words, the exploratory request may identify a goal for a conversation, instead of a particular task to perform or information to retrieve. As such, in various implementations, an advertisement may be selected in operation 320 in an effort to advance the conversation towards the goal. For example, an exploratory request may include a request for a navigation route (e.g., "I feel like going to a museum, find me something interesting"). Based on a context of the requested task (e.g., "Navigation," "Points of Interest," etc.), the goal of the conversation may be identified, and the request may be serviced in operation 315 (e.g., a voice search engine may locate nearby points of interest based on user preferred topics). Further, the advertising application may select an appropriate advertisement in operation 320, where the advertisement may be selected in an attempt to advance the conversation towards the goal. For example, statistical profiles (e.g., user profiles, global profiles, topic-based profiles, etc.) may reflect an affinity between an advertisement for a particular museum and other users sharing similar demographics or other characteristics with the requesting user. Thus, in addition to retrieving information about museums in operation 315, an advertisement for a museum likely to be of interest to the user may be selected in operation 320.

In various instances, a request may include incomplete, ambiguous, unrecognized, or otherwise insufficient semantic indicators, context, qualifiers, or other information needed to identify the request. In other words, the request may include inadequate information to identify or infer a task to perform, information to retrieve, or a goal for a conversation. Thus, as much information as possible may be extracted and/or inferred from the request based on shared knowledge such as context, user or global profile information, previous utterances, previous conversations, etc. As such, servicing the request may include generating a response and/or communicating with an advertising application to advance a conversation toward a serviceable request. For example, servicing the request in operation 315 and selecting an advertisement in operation 320 may include generating a response and/or selecting an advertisement to frame a subsequent user input, thereby advancing the conversation.

For example, the request may include incomplete, ambiguous, or unrecognized information (e.g., "Do you know [mumbled words] Seattle?"). A context of the requested task may be identified (e.g., "Seattle"), yet the identified context may be insufficient to adequately take action to service the request. Additional information may be inferred based on previous utterances in the conversation, profile information, or other information. However, when the additional information fails to provide adequate information to infer a reasonable hypothesis, servicing the request in operation 315 may include generating a response to frame a subsequent user input and advance the conversation (e.g., information about various topics may be retrieved based on a user's preferred topics). Further, the advertising application may select an advertisement in operation 320 to advance the conversation (e.g., advertisements may be selected based on user and/or global profiles reflecting an affinity between certain advertisements associated with Seattle and user preferences, profiles, etc.). Thus, by selecting an advertisement, indicating dissatisfaction with an advertisement, or otherwise interacting with an advertisement, the interaction may be used to build context and shared knowledge for a subsequent course of the conversation. For example, a user may select an advertisement, and an interpretation of a subsequent voice-based input (e.g., "Call them," "What's the price range?" etc.) may be interpreted with shared knowledge of the advertisement that the voice-based input relates to. Thus, advertisements may be used in a way that enables advertisers to market to consumers, while also improving the consumers' interaction with a device. Other advantages will be apparent to those skilled in the art.

It will be apparent that operation 320 may use various techniques to select advertisements based on voice-based inputs and/or requests included therein. For example, an advertiser may specify a target audience, marketing criteria, campaign strategies, budget constraints, concepts, semantic indicators, related topics, categories, and/or any other suitable information to associate with an advertisement. For instance, advertisers may pay a premium to prioritize an advertisement in relation to similar advertisements (e.g., advertisements associated with competitors). In another example, various statistical profiles may define affinities between advertisements, topics, users, etc. (e.g., based on click-through or conversion rates, or other tracking information, as described in more detail below). Thus, advertisements may be selected in operation 320 using various techniques, including content of the request, an activity/action associated with the request, user profiles, user preferences, statistical metrics, advertiser-specified criteria, to advance a conversation, to resolve ambiguous requests, or in various other ways, as will be apparent.

The output presented to the user in operation 325 may be provided to the user in various ways. For example, in various implementations, the output may include a voice-based or otherwise audible response. In another example, when an associated device includes a display mechanism, the output may be displayed on the display device. It will be apparent that many combinations or variants thereof may be used, such as augmenting a voice-based response with information on a display device. For example, a user may request information about restaurants, and an advertisement may be selected based on a user preference indicating a favorite type of restaurant (e.g., a Chinese restaurant may be selected based on a user profile indicating a preference for Chinese). Therefore, in one example, the output presented in operation 325 may display information about various restaurants matching the requested information, while a voice-based advertisement for the Chinese restaurant may be played to the user (e.g., via a speaker or other suitable mechanism for playing voice back to the user). Many other variations will be apparent (e.g., a graphical advertisement may be displayed on a display device, while a corresponding or different voice-based advertisement may be played audibly).

Subsequent interaction between the user and the presented advertisements may be monitored in a decisional operation 330. For instance, when the user elects to interact with the advertisement, action may be taken based on the interaction in an operation 335. The interaction may take various forms, including additional voice-based inputs or other suitable mechanisms for interacting with advertisements (e.g., clicking on an advertisement displayed on a personal digital assistant using an associated stylus). For example, a user may initially request information from a voice-enabled media device (e.g., a satellite radio player) about a song currently playing (e.g., "What is this song?"). In addition to outputting the requested information about the song (e.g., "This song is Double Barrel by Dave and Ansel Collins."), a selected advertisement may enable the user to purchase a ringtone for a mobile phone that corresponds to the song. In this example, the interaction may include a request to purchase the ringtone (e.g., "Yeah, I'll buy that"), and action taken in operation 335 may include completing a transaction for the ringtone and/or downloading the ringtone to the mobile phone. Furthermore, additional advertisements may be selected in an operation 340 based on the interaction, using similar techniques as described in connection with operation 320 (e.g., advertisements for additional ringtones, similar musicians, etc. may be selected). Processing may subsequently return to operation 325 to present output resulting from the interaction.

User advertisement interaction may be tracked in an operation 345. For example, operation 345 may track historical data about users, conversations, topics, contexts, or other criteria to associate information with the selected advertisement. The tracking information may therefore be used to build statistical profiles defining affinities, click-through or conversion rates, or other information about various advertisements, topics, or other criteria on a user-specific and/or a global-user level. Thus, clusters or mappings may be created between advertisements, topics, concepts, demographics, or other criteria based on user behavior with the advertisements (e.g., whether a user interacts with the advertisement in operation 330).

For instance, certain advertisements may experience high click-through rates in relation to a first context and/or topic, but low click-through rates in relation to a second context and/or topic, and therefore, when requests relate to the first context and/or topic, the advertisement may be more likely to be selected in subsequent operations 320/340. In another example, global statistical profiles may indicate that an advertisement experiences more click-throughs by users of a particular demographic, and therefore, the advertisement may be more likely to be selected for users falling within the demographic. Many different techniques for tracking and building statistical profiles will be apparent.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be apparent to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for processing natural language utterances that include requests and selecting and presenting advertisements based thereon, the method being implemented by one or more physical processors programmed with computer program instructions, which when executed cause the one or more physical processors to perform the method, the computer program instructions comprising at least a conversational language processor configured to interpret a natural language utterance, which relates to a request, based on words or phrases recognized from the natural language utterance, the method comprising:

in response to receiving the natural language utterance, providing the natural language utterance as an input to a speech recognition engine;

in response to receiving the words or phrases, recognized from the natural language utterance, as an output of the speech recognition engine, providing the words or phrases as an input to the conversational language processor;

interpreting the natural language utterance, at the conversational language processor, based on the recognized words or phrases;

determining the request based on the interpretation of the natural language utterance;

determining a context for the natural language utterance based at least on the recognized words or phrases;

selecting an advertisement based at least on the determined context;

providing the selected advertisement via an output device coupled to the conversational language processor;

obtaining a response to the request;

providing the response to the request;

in response to receiving a second natural language utterance, providing the second natural language utterance as an input to the speech recognition engine;

in response to receiving a second set of words or phrases, recognized from the second natural language utterance, as a second output of the speech recognition engine, providing the second set of words or phrases as a second input to the conversational language processor;

interpreting the second natural language utterance at the conversational language processor based on the recognized second set of words or phrases and the determined context; and determining a second request, related to the advertisement, based on the interpretation of the second natural language utterance; and obtaining and providing a second response to the second request.

2. The method of claim 1, wherein the conversational language processor comprises one or more domain agents, where a domain agent is configured to assist in: i) interpreting requests related to its domain; and ii) determining a response to the requests related to its domain.

3. The method of claim 2, wherein the domain agents comprise an electronic commerce agent and selecting an advertisement comprises selecting an advertisement that corresponds to an electronic commerce opportunity.

4. The method of claim 1, wherein the conversational language processor is configured to communicate with one or more domain-specific applications, and in response to a request relating to a domain specific application, the conversational language processor invoking the domain specific application to assist in processing the request.

5. The method of claim 4, wherein the domain-specific applications include an electronic commerce application and selecting an advertisement comprises selecting an advertisement that corresponds to an electronic commerce opportunity.

6. The method of claim 1, the method further comprising:
using an environmental model to determine environmental information, wherein determining a context for the natural language utterance is based further on the environmental information.

7. The method of claim 6, wherein the environmental information comprises a user location, a user activity, or a user action.

8. The method of claim 6, wherein determining the request is based further on the context.

9. The method of claim 1, wherein presenting the advertisement comprises:
audibly presenting a natural language conversational advertisement.

10. The method of claim 1, wherein obtaining the response comprises: (i) servicing the request and determining the response, or (ii) providing the request to a remote device and receiving the response from the remote device.

11. The method of claim 1, wherein the response and the advertisement are provided together or separately.

12. The method of claim 1, wherein obtaining and providing the second response comprises facilitating a purchase or obtaining additional information related to the advertisement.

13. A method for processing natural language utterances that include requests and selecting and presenting advertisements based thereon, the method being implemented by one or more physical processors programmed with computer program instructions, which when executed cause the one or more physical processors to perform the method, the computer program instructions comprising at least a conversational language processor configured to interpret a natural language utterance, which relates to a request, based on words or phrases recognized from the natural language utterance, the method comprising:

in response to receiving the natural language utterance, providing the natural language utterance as an input to a speech recognition engine;

in response to receiving the words or phrases, recognized from the natural language utterance, as an output of the speech recognition engine, providing the words or phrases as an input to the conversational language processor;

interpreting the natural language utterance, at the conversational language processor, based on the recognized words or phrases;

determining the request based on the interpretation of the natural language utterance;

determining a context for the natural language utterance based at least on the recognized words or phrases;

selecting an advertisement based at least on the determined context;

providing the selected advertisement via an output device coupled to the conversational language processor;

obtaining a response to the request;

providing the response to the request;

receiving an indication that a user interaction with the advertisement has occurred;

determining whether the interpretation of the natural language utterance was correct based on the indication; and interpreting a subsequent natural language utterance based on the determination of whether the interpretation of the natural language utterance was correct.

14. A method for processing natural language utterances that include requests and selecting and presenting advertisements based thereon, the method being implemented by one or more physical processors programmed with computer program instructions, which when executed cause the one or more physical processors to perform the method, the computer program instructions comprising at least a conversational language processor configured to interpret a natural language utterance, which relates to a request, based on words or phrases recognized from the natural language utterance, the method comprising:

in response to receiving the natural language utterance, providing the natural language utterance as an input to a speech recognition engine;

in response to receiving the words or phrases, recognized from the natural language utterance, as an output of the speech recognition engine, providing the words or phrases as an input to the conversational language processor;

interpreting the natural language utterance, at the conversational language processor, based on the recognized words or phrases;

determining the request based on the interpretation of the natural language utterance;

determining a context for the natural language utterance based at least on the recognized words or phrases;

selecting an advertisement based at least on the determined context;

providing the selected advertisement via an output device coupled to the conversational language processor;

obtaining a response to the request;

providing the response to the request;

receiving an indication that a user interaction with the advertisement has occurred;

determining that a subsequent natural language utterance relates to an advertisement context based on the indication;

in response to receiving a second natural language utterance after the user interaction, providing the second natural language utterance as an input to the speech recognition engine;

in response to receiving a second set of words or phrases, recognized from the second natural language utterance, as a second output of the speech recognition engine, providing the second set of words or phrases as a second input to the conversational language processor;

interpreting the second natural language utterance at the conversational language processor based on the recognized second set of words or phrases and the advertisement context; and determining a second request, related to the advertisement, based on the interpretation of the second natural language utterance; and obtaining and providing a second response to the second request.

15. A method for processing natural language utterances that include requests and selecting and presenting advertisements based thereon, the method being implemented by one or more physical processors programmed with computer program instructions, which when executed cause the one or more physical processors to perform the method, the computer program instructions comprising at least a conversational language processor configured to interpret a natural language utterance, which relates to a request, based on words or phrases recognized from the natural language utterance, the method comprising:

in response to receiving the natural language utterance, providing the natural language utterance as an input to a speech recognition engine;

in response to receiving the words or phrases, recognized from the natural language utterance, as an output of the speech recognition engine, providing the words or phrases as an input to the conversational language processor;

interpreting the natural language utterance, at the conversational language processor, based on the recognized words or phrases;

determining the request based on the interpretation of the natural language utterance;

determining a context for the natural language utterance based at least on the recognized words or phrases;

selecting an advertisement based at least on the determined context;

providing the selected advertisement via an output device coupled to the conversational language processor;

obtaining a response to the request;

providing the response to the request;

in response to a determination that the natural language utterance includes incomplete or unrecognized words or phrases such that insufficient information is available to determine the request, selecting a plurality of advertisements, each advertisement relating to its own context;

presenting the plurality of advertisements to the output device; and receiving an indication that a user interaction has occurred with at least one of the plurality of advertisements, wherein determining the request is based further on a corresponding context of an advertisement, among the plurality of advertisements, with which the user interaction occurred.

16. A system for processing natural language utterances that include requests and selecting and presenting advertisements based thereon, the system comprising:

one or more physical processors programmed with computer program instructions, the computer program instructions comprising at least a conversational language processor configured to interpret a natural language utterance, which relates to a request, based on words or phrases recognized from the natural language utterance, the computer program instructions which when executed cause the one or more physical processors to:

in response to receipt of the natural language utterance, provide the natural language utterance as an input to a speech recognition engine;

in response to receipt of the words or phrases, recognized from the natural language utterance, as an output of the speech recognition engine, provide the words or phrases as an input to the conversational language processor;

interpret the natural language utterance, at the conversational language processor, based on the recognized words or phrases;

determine the request based on the interpretation of the natural language utterance;

determine a context for the natural language utterance based at least on the recognized words or phrases;

select an advertisement based at least on the determined context;

provide the selected advertisement via an output device coupled to the conversational language processor;

obtain a response to the request;

provide the response to the request;

in response to receipt of a second natural language utterance, provide the second natural language utterance as an input to the speech recognition engine;

in response to receipt of a second set of words or phrases, recognized from the second natural language utterance, as a second output of the speech recognition engine, provide the second set of words or phrases as a second input to the conversational language processor;

interpret the second natural language utterance at the conversational language processor based on the recognized second set of words or phrases and the determined context; and determine a second request, related to the advertisement, based on the interpretation of the second natural language utterance; and obtaining and providing a second response to the second request.

17. The system of claim 16, wherein the conversational language processor comprises one or more domain agents, where a domain agent is configured to assist: i) interpret requests related to its domain; and ii) determine a response to the requests related to its domain.

18. The system of claim 17, wherein the domain agents comprise an electronic commerce agent and wherein to select an advertisement, the one or more physical processors are further programmed to: select an advertisement that corresponds to an electronic commerce opportunity.

19. The system of claim 16, wherein the one or more physical processors are further programmed to communicate with one or more domain-specific applications, and in response to a request relating to a domain specific application, invoke the domain specific application to assist process the request.

20. The system of claim 19, wherein the domain-specific applications include an electronic commerce application and wherein to select an advertisement, the one or more physical processors are programmed to select an advertisement that corresponds to an electronic commerce opportunity.

21. The system of claim 16, wherein the one or more physical processors are further programmed to:
use an environmental model to determine environmental information, wherein the context for the natural language utterance is determined based further on the environmental information.

22. The system of claim 21, wherein the environmental information comprises a user location, a user activity, or a user action.

23. The system of claim 21, wherein the determined request is based further on the context.

24. The system of claim 16, wherein to present the advertisement, the one or more physical processors are programmed to:
audibly present a natural language conversational advertisement.

25. The system of claim 16, wherein to obtain the response, the one or more physical processors are further programmed to: (i) service the request and determine the response, or (ii) provide the request to a remote device and receive the response from the remote device.

26. The system of claim 16, wherein the response and the advertisement are provided together or separately.

27. The system of claim 16, wherein to obtain and provide the second response, the one or more physical processors are programmed to facilitate a purchase or obtain additional information related to the advertisement.

28. A system for processing natural language utterances that include requests and selecting and presenting advertisements based thereon, the system comprising:
one or more physical processors programmed with computer program instructions, the computer program instructions comprising at least a conversational language processor configured to interpret a natural language utterance, which relates to a request, based on words or phrases recognized from the natural language utterance, the computer program instructions which when executed cause the one or more physical processors to:
in response to receipt of the natural language utterance, provide the natural language utterance as an input to a speech recognition engine;
in response to receipt of the words or phrases, recognized from the natural language utterance, as an output of the speech recognition engine, provide the words or phrases as an input to the conversational language processor;
interpret the natural language utterance, at the conversational language processor, based on the recognized words or phrases;
determine the request based on the interpretation of the natural language utterance;
determine a context for the natural language utterance based at least on the recognized words or phrases;
select an advertisement based at least on the determined context;
provide the selected advertisement via an output device coupled to the conversational language processor;
obtain a response to the request;
provide the response to the request;
receive an indication that a user interaction with the advertisement has occurred;
determine whether the interpretation of the natural language utterance was correct based on the indication; and
interpret a subsequent natural language utterance based on the determination of whether the interpretation of the natural language utterance was correct.

29. A system for processing natural language utterances that include requests and selecting and presenting advertisements based thereon, the system comprising:
one or more physical processors programmed with computer program instructions, the computer program instructions comprising at least a conversational language processor configured to interpret a natural language utterance, which relates to a request, based on words or phrases recognized from the natural language utterance, the computer program instructions which when executed cause the one or more physical processors to:
in response to receipt of the natural language utterance, provide the natural language utterance as an input to a speech recognition engine;
in response to receipt of the words or phrases, recognized from the natural language utterance, as an output of the speech recognition engine, provide the words or phrases as an input to the conversational language processor;
interpret the natural language utterance, at the conversational language processor, based on the recognized words or phrases;
determine the request based on the interpretation of the natural language utterance;
determine a context for the natural language utterance based at least on the recognized words or phrases;
select an advertisement based at least on the determined context;
provide the selected advertisement via an output device coupled to the conversational language processor;
obtain a response to the request;
provide the response to the request;
receive an indication that a user interaction with the advertisement has occurred;
determine that a subsequent natural language utterance relates to an advertisement context based on the indication;
in response to receipt of a second natural language utterance after the user interaction, provide the second natural language utterance as an input to the speech recognition engine;
in response to receipt of a second set of words or phrases, recognized from the second natural language utterance, as a second output of the speech recognition engine, provide the second set of words or phrases as a second input to the conversational language processor;
interpret the second natural language utterance at the conversational language processor based on the recognized second set of words or phrases and the advertisement context; and
determine a second request, related to the advertisement, based on the interpretation of the second natural language utterance; and
obtain and provide a second response to the second request.

30. A system for processing natural language utterances that include requests and selecting and presenting advertisements based thereon, the system comprising:
one or more physical processors programmed with computer program instructions, the computer program instructions comprising at least a conversational language processor configured to interpret a natural language utterance, which relates to a request, based on words or phrases recognized from the natural language utterance, the computer program instructions which when executed cause the one or more physical processors to:

in response to receipt of the natural language utterance, provide the natural language utterance as an input to a speech recognition engine;

in response to receipt of the words or phrases, recognized from the natural language utterance, as an output of the speech recognition engine, provide the words or phrases as an input to the conversational language processor;

interpret the natural language utterance, at the conversational language processor, based on the recognized words or phrases;

determine the request based on the interpretation of the natural language utterance;

determine a context for the natural language utterance based at least on the recognized words or phrases;

select an advertisement based at least on the determined context;

provide the selected advertisement via an output device coupled to the conversational language processor;

obtain a response to the request;

provide the response to the request;

in response to a determination that the natural language utterance includes incomplete or unrecognized words or phrases such that insufficient information is available to determine the request, select a plurality of advertisements, each advertisement relating to its own context;

present the plurality of advertisements to the output device;

receive an indication that a user interaction has occurred with at least one of the plurality of advertisements, wherein the determination of the request is based further on a corresponding context of an advertisement, among the plurality of advertisements, with which the user interaction occurred.

* * * * *